United States Patent
Baek et al.

(10) Patent No.: US 7,933,687 B2
(45) Date of Patent: Apr. 26, 2011

(54) MOVING OBJECT CAPABLE OF RECOGNIZING IMAGE AND MOVING-OBJECT DIRECTING SYSTEM EQUIPPED WITH THE SAME

(75) Inventors: Oh-hyun Baek, Incheon (KR); Ho-seon Rew, Seoul (KR)

(73) Assignee: LG Electronics Inc., Seoul (KR)

( * ) Notice: Subject to any disclaimer, the term of this patent is extended or adjusted under 35 U.S.C. 154(b) by 1285 days.

(21) Appl. No.: 11/489,511

(22) Filed: Jul. 20, 2006

(65) Prior Publication Data
US 2007/0021869 A1   Jan. 25, 2007

(30) Foreign Application Priority Data
Jul. 22, 2005   (KR) ................. 10-2005-0066973

(51) Int. Cl.
*G06F 19/00* (2006.01)
(52) U.S. Cl. .......... 700/259; 700/245; 700/258; 901/46; 901/47; 318/568.12
(58) Field of Classification Search .................. 700/245, 700/253, 258, 259; 901/1, 46, 47; 318/568.12
See application file for complete search history.

(56) References Cited

U.S. PATENT DOCUMENTS

| | | | |
|---|---|---|---|
| 4,834,531 A * | 5/1989 | Ward | 356/5.08 |
| 5,525,883 A * | 6/1996 | Avitzour | 318/587 |
| 5,745,235 A * | 4/1998 | Vercammen et al. | 356/623 |
| 6,764,373 B1 * | 7/2004 | Osawa et al. | 446/175 |
| 6,812,933 B1 * | 11/2004 | Silver | 345/619 |
| 6,912,449 B2 * | 6/2005 | Sabe et al. | 700/259 |
| 2004/0088080 A1 * | 5/2004 | Song et al. | 700/259 |

FOREIGN PATENT DOCUMENTS

| | | |
|---|---|---|
| KR | 10-2003-0013009 A | 2/2003 |
| KR | 10-2004-0062040 A | 7/2004 |

OTHER PUBLICATIONS

R. Lou C. Liao, and K. Lin, "Vision Based Docking for Automatic Security Robot Power Recharging," In. Proc IEEE Workshop on Advanced Robotics and its Social Impacts, Jun. 2005, pp. 214-219.*

* cited by examiner

*Primary Examiner* — Thomas G Black
*Assistant Examiner* — Peter D Nolan
(74) *Attorney, Agent, or Firm* — Birch, Stewart, Kolasch & Birch, LLP

(57) ABSTRACT

A moving object capable of recognizing an image and a system for directing the moving object are disclosed. The system for directing the moving object includes: a charging device on which a docking direction pattern is printed, such that a central point of the docking direction pattern for directing the moving object to a docking location and a power-supply terminal are arranged in a straight line; and a moving object for driving wheel operations to allow the central point of the docking direction pattern captured by a camera to be identical with a central point of an image captured by the camera, and moving to the docking location. The moving-object directing system drives a wheel to track a central point of the docking direction pattern captured by a camera, such that it can quickly and correctly move to the docking location of the charging device.

8 Claims, 4 Drawing Sheets

(a)

(b)

MOVING OBJECT CAPABLE OF RECOGNIZING IMAGE AND MOVING-OBJECT DIRECTING SYSTEM EQUIPPED WITH THE SAME

BACKGROUND OF THE INVENTION

1. Field of the Invention

The present invention relates to a system for directing a moving object, and more particularly to a moving object capable of recognizing an image, and a moving-object directing system equipped with the moving object.

2. Description of the Related Art

Typically, a robot developed for industrial purposes is being widely used to achieve factory automation, and collects data or information on behalf of a human being under an extreme situation which is unbearable for the human being.

Recently, the above-mentioned robotics technologies have been used for space industries, and have been rapidly developed in various ways, resulting in the implementation of human-friendly household robots.

The human-friendly household mobile robot uses a battery to guarantee mobility at any place. If a voltage of the battery is equal to or less than a predetermined voltage, the human-friendly household mobile robot is programmed to automatically return to a charging device, such that the battery is recharged.

FIGS. 1 and 2 are conceptual diagrams illustrating a conventional method for docking a cleaning robot, used as an example of a moving object, to a charging device.

Referring to FIGS. 1 and 2, a cleaning robot 1 receives a directing signal from a directing signal transmitter 8 of a charging device 5, returns to a location of the charging device 5, and then moves to a docking location (i.e., a location of a power-supply terminal of the charging device) according to the following method.

In other words, the circumference of the conventional cleaning robot 1 includes an arc-shaped charging terminal 2 for charging a battery with electricity. In other words, the same contact sensors 4A and 4B for directing the cleaning robot to a docking location are installed at both sides of the charging terminal 2. A power-supply terminal 6 is installed at a front side of the charging device 5, and a pair of guides 7 is installed at both sides of the charging device 5.

Therefore, a controller for controlling overall moving operations of the cleaning robot 1 rotates driving wheels 1A and 1B in a forward or reverse direction when the contact sensors 4A and 4B touch the guide 7, such that it controls a proceeding direction of the cleaning robot 1 to touch the power-supply terminal 6 with the charging terminal 2 of the cleaning robot 1.

However, the above-mentioned conventional method determines whether the contact sensors 4A and 4B touch the guide 7 without using correct numerical information, and moves the cleaning robot 1 to the docking location according to the determined result, such that unnecessary movement occurs several times when the charging terminal 2 docks with the power-supply terminal 6.

Also, the guide 7 for directing the cleaning robot 1 to the docking location must be installed to the charging device 5, such that a mechanical structure of the charging device 5 is complicated, and the charging device 5 may be easily damaged by external impact due to the projected guide 7.

SUMMARY OF THE INVENTION

Therefore, the present invention has been made in view of the above problems, and it is an object of the invention to provide a moving object capable of rapidly and correctly moving to a docking location of a charging device to recognize an image, and a moving object directing system equipped with the moving object.

It is another object of the present invention to provide a moving object capable of rapidly and correctly moving to a docking location without mechanically modifying a charging device or without using additional mechanical equipment, and a moving object directing system equipped with the moving object.

In accordance with one aspect of the present invention, the above and other objects can be accomplished by the provision of a moving object capable of recognizing an image comprising: a camera for capturing an image of a docking direction pattern capable of directing a moving object to a docking location; a docking direction pattern extractor for extracting the docking direction pattern and its central point from the captured image; a distance-information calculator for calculating distance information from a current location to the docking location according to a ratio of the number of pixels of the extracted docking direction pattern to the number of pixels of the docking direction pattern captured at a reference location; an offset-information calculator for calculating a central point of the extracted docking direction pattern, a central point contained in the captured image, and the distance information of the distance to the docking location, and calculating moving-object offset information from the docking location; and a wheel drive for driving wheel operations of the moving object according to the offset information and the distance information.

In accordance with another aspect of the present invention, there is provided a system for directing a moving object comprising: a charging device on which a docking direction pattern is printed, such that a central point of the docking direction pattern for directing the moving object to a docking location and a power-supply terminal are arranged in a straight line; and a moving object for driving wheel operations to allow the central point of the docking direction pattern captured by a camera to be identical with a central point of an image captured by the camera, and moving to the docking location.

Therefore, the moving-object directing system according to the present invention drives a wheel to track a central point of the docking direction pattern captured by a camera, such that it can quickly and correctly move to the docking location of the charging device.

In addition, the moving-object directing system according to the present invention uses the docking direction pattern mountable to the charging device, such that it can quickly and correctly direct the moving object to the docking location without mechanically modifying the charging device or without using additional mechanical equipment.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
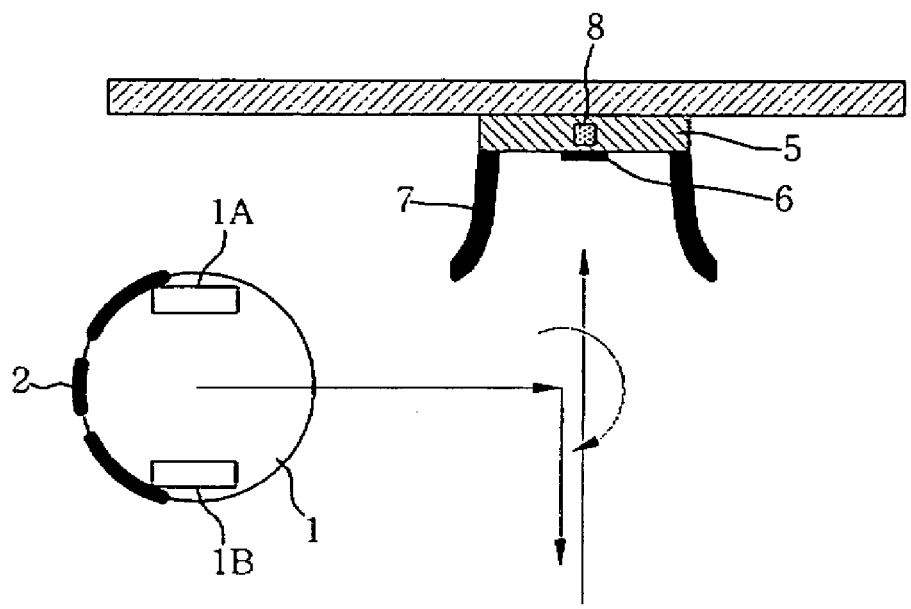
FIGS. 1 and 2 are conceptual diagrams illustrating a conventional method for docking a cleaning robot, used as an example of a moving object, to a charging device.
Figure 2:
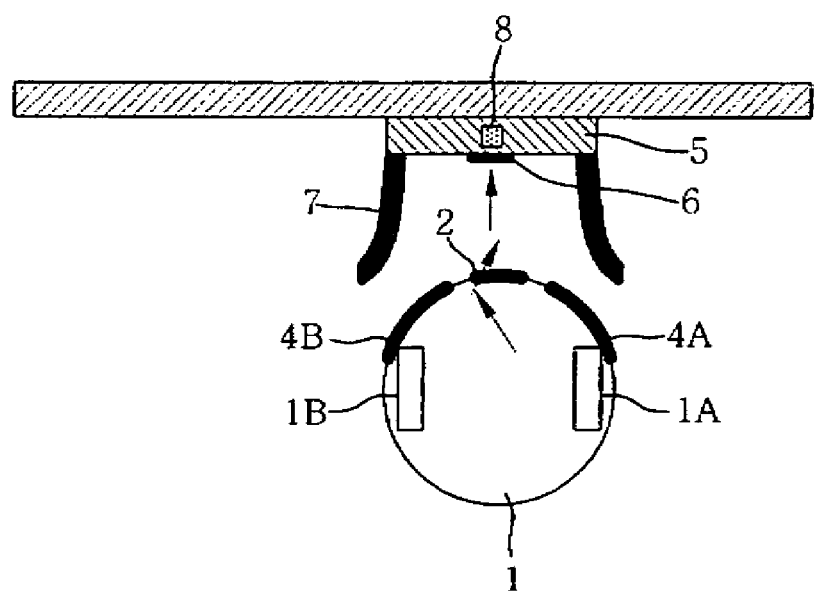

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 3:
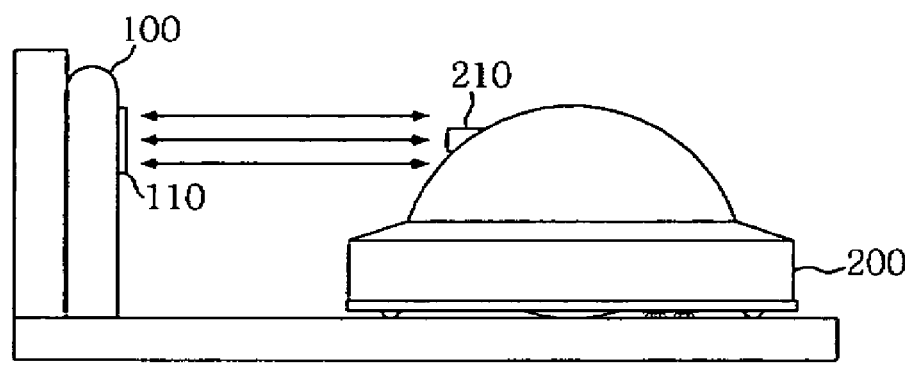
FIG. 3 is a structural diagram illustrating a moving object and a charging device contained in a moving object directing system according to a preferred embodiment of the present invention.
Figure 4:
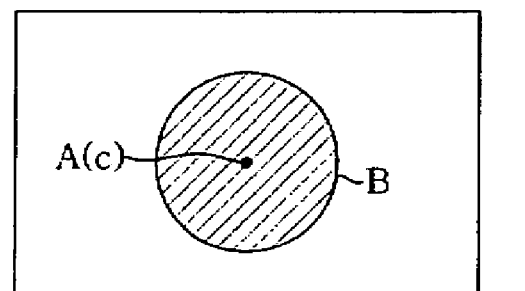
FIG. 4 is a conceptual diagram illustrating a docking direction pattern printed on a charging device to facilitate the docking of the moving object according to the present invention.
Figure 4:
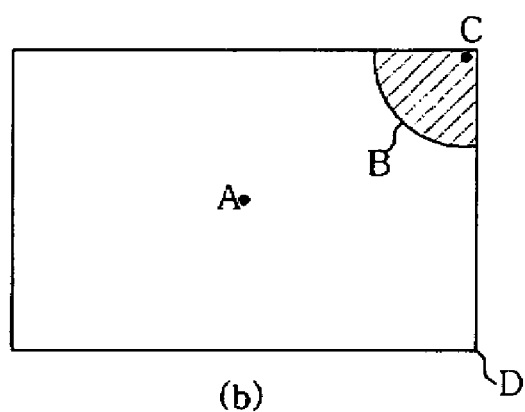
Figure 5:
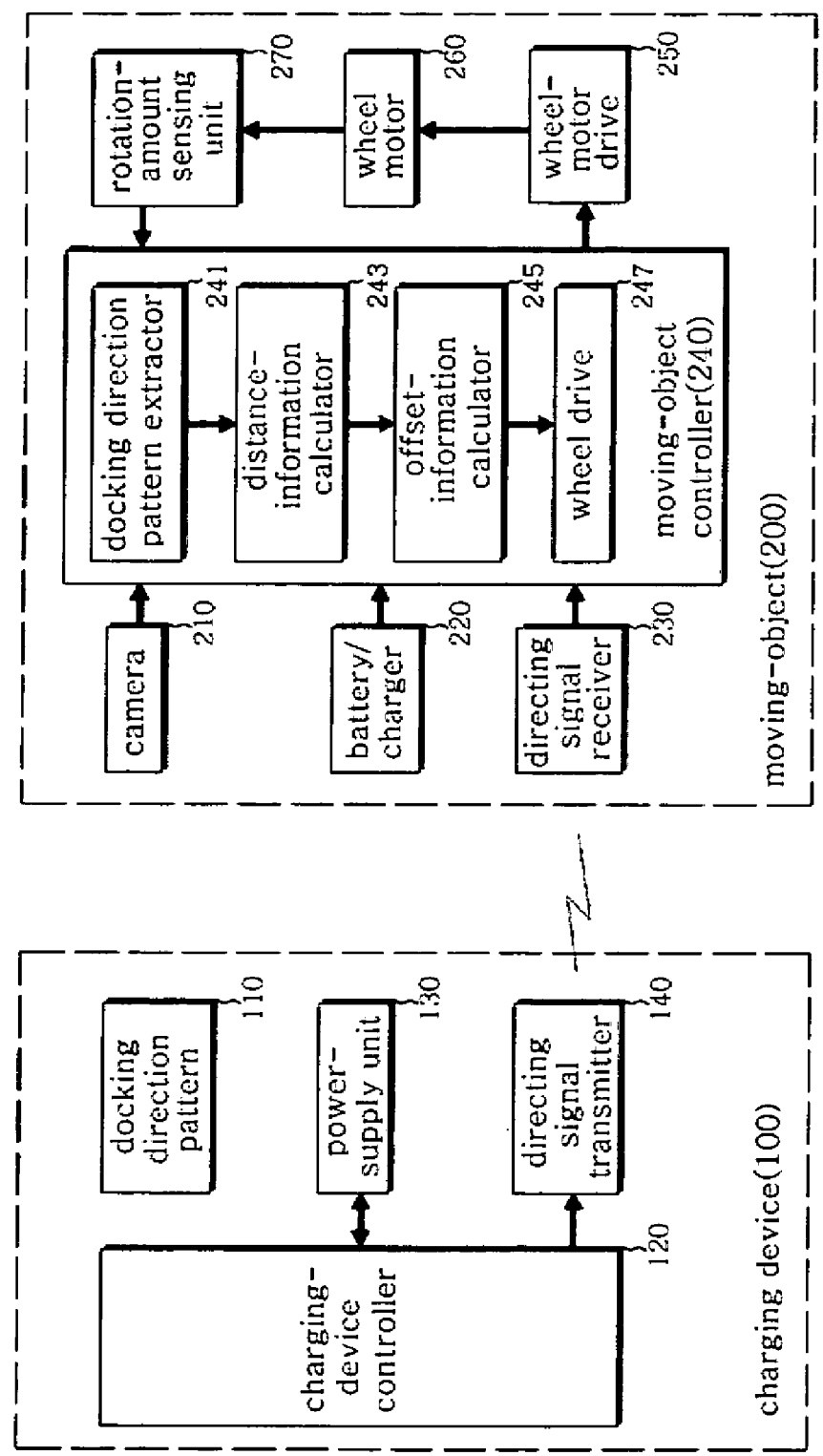
FIG. 5 is a block diagram illustrating a system for directing a moving object according to a preferred embodiment of the present invention.

FIG. 3 is a structural diagram illustrating a moving object 200 and a charging device 100 contained in a moving object directing system according to a preferred embodiment of the present invention. FIG. 4 is a conceptual diagram illustrating a docking direction pattern 110 (B) printed on a charging device 100 to facilitate the docking of the moving object 200 according to the present invention. FIG. 5 is a block diagram illustrating a system for directing a moving object according to a preferred embodiment of the present invention.

Referring to FIG. 3, the moving object directing system mainly includes a moving object 200 movable in a predetermined area within a predetermined range allowed by a battery charging level, and a charging device 100 for charging the battery of the moving object 200.

The docking direction pattern 110 (B) is printed on the charging device 100, such that a power-supply terminal of the charging device 100 and a central point of the docking direction pattern 110 (B) are located at a vertical axis. A representative example of the docking direction pattern 110 (B) is shown in FIG. 4(a).

The docking direction pattern B is used as an auxiliary feature for directing the moving object 200 to a docking location. The docking direction pattern B and the central point C are colored in different ways, such that different brightness levels are assigned to the docking direction pattern B and the central point C.

The reason why the docking direction pattern B and the central point C thereof are colored in different brightness levels is to detect an offset rotation angle of the moving object 200 with respect to the docking location using the central point C.

Although the present invention assumes that the docking direction pattern B and the central point C thereof are colored in different brightness levels, it should be noted that the docking direction pattern B and the central point C may also be colored in the same brightness level as necessary.

In this case, the present invention adapts an algorithm for extracting a shape of the docking direction pattern, and acquiring a central point from the extracted shape, such that it can detect an offset rotation angle of the moving object 200 with respect to the docking location.

Referring to FIG. 5, the charging device 100 includes a power-supply unit 130 for providing a battery of the moving object 200 with a charging voltage, and a charging-device controller 120 for controlling operations of the charging device 100. The charging device 100 may further include a directing signal transmitter 140 for transmitting a docking direction signal (e.g., an infrared or ultrasound signal) as an auxiliary unit capable of rapidly correcting the docking of the moving object 200.

In the meantime, a camera 210 for capturing an image of the above-mentioned docking direction pattern is mounted to an external part of the cleaning robot acting as the moving object 200, or is contained in a main body of the cleaning robot.

The camera 210 is mounted to an external part of the cleaning robot or is contained in a main body of the cleaning robot, such that a power-supply terminal of the charging device 100 and a charging terminal of the moving object are arranged in a straight line, and a central point A of FIG. 4(a) of the image captured by the camera 210 is identical with a central point C of the docking direction pattern B at a specific reference location spaced apart from the charging device 100 by a predetermined distance. The reason for the above-mentioned camera 210's coupling structure is to detect offset information of the moving object 200 by detecting the central point C of the docking direction pattern.

For reference, the above-mentioned reference location is required for calculating a distance from a current location to the docking location. If the number of pixels of the docking direction pattern acquired at the reference location are pre-registered in a memory of the moving object 200, the distance to the reference location can be calculated by a ratio of the number of registered pixels to the number of newly-extracted docking direction pattern pixels. For example, a specific location at which a power-supply terminal of the charging device 100 is coupled to a charging terminal of the moving object 200 may also be determined to be the reference location.

As shown in FIG. 5, the moving object 200 includes a docking direction pattern extractor 241, a distance-information calculator 243, an offset-information calculator 245, and a wheel drive 247.

The docking direction pattern extractor 241 extracts a docking direction pattern B and its central point C from the image captured by the camera 210. The distance-information calculator 243 calculates a distance to the docking location according to a ratio of the number of pixels of the extracted docking direction pattern B and the number of docking direction pattern pixels captured by the camera 210 at a reference location. The offset-information calculator 245 calculates the central point C of the extracted docking direction pattern B, the central point A of the captured image, and calculates distance information of the distance to the docking location, such that it calculates moving-object offset information from the docking location. The wheel drive 247 controls wheel operations of the moving object according to the above-mentioned offset information and the above-mentioned distance information.

The moving object 200 may further include a directing signal receiver 230 capable of receiving a docking direction signal (i.e., an infrared or ultrasound signal) from the directing signal transmitter 140 of the charging device 100, such that it can quickly and correctly direct the docking operation.

A reference numeral 220 from among several components of the moving object 200 in FIG. 5 is indicative of a battery for providing the moving object 200 with driving power, and a charger for charging the battery. A reference numeral 250 of FIG. 5 is indicative of a wheel-motor drive for driving a wheel motor according to a drive control signal of the moving-object controller 240.

A reference numeral 270 of FIG. 5 is indicative of a rotation-amount detector 270 acting as an encoder connected to each of left and right wheels. The rotation-amount detector 270 detects an amount of rotation of each of the left and right wheels, and transmits rotation number data corresponding to the detected rotation amount to the moving-object controller 240. The above-mentioned components 220, 250, and 270 are general components of the conventional cleaning robot, such that a detailed description thereof will herein be omitted for the convenience of description.

Figure 6:
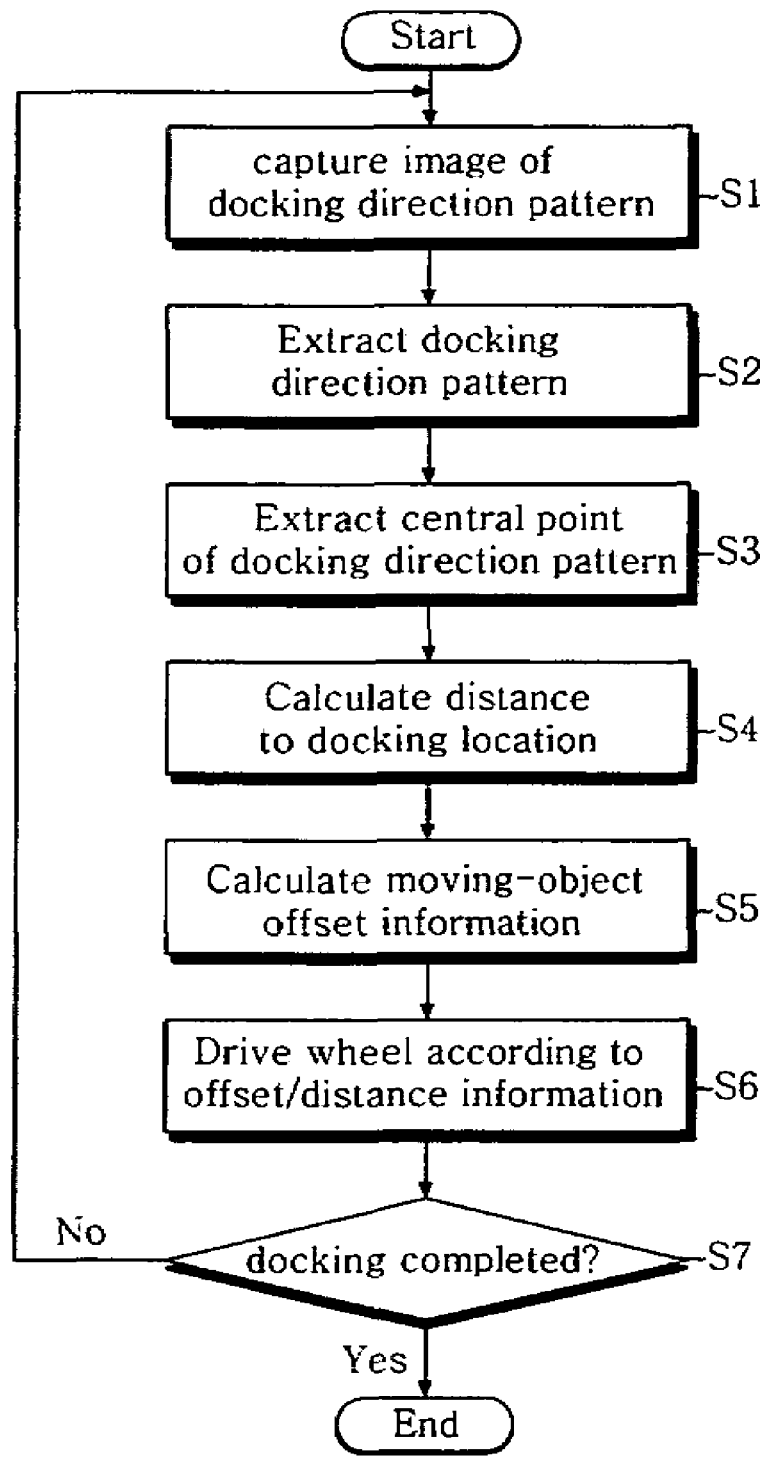
FIG. 6 is a flow chart illustrating a method for docking a moving object to a charging device according to the present invention.

FIG. 6 is a flow chart illustrating a method for directing a moving object 200 to a docking location of the charging device according to the present invention.

Referring to FIG. 6, if a battery voltage is equal to or less than a predetermined voltage, the camera 210 of the moving object 200 captures an image of the docking direction pattern B printed on (or mounted to) the charging device 100 according to a control signal of the moving-object controller 240 at step S1. In this case, the docking direction pattern extractor 241 periodically extracts the docking direction pattern B and its central point C from the captured image at steps S2 and S3.

In other words, since the docking direction pattern extractor 241 pre-recognizes colored information of the docking direction pattern, it can extract the docking direction pattern B from the image using a specific technique for detecting an edge of a region having a brightness level and the colored information. And, the central point C of the docking direction pattern B has another brightness level different from the above-mentioned brightness level of the docking direction pattern B, such that it can extract the central point C from the docking direction pattern B.

In this way, if the docking direction pattern B and its central point C are completely extracted, the distance-information calculator 245 calculates distance information from a current location to a real docking location according to a ratio of the number of pixels of the extracted docking direction pattern B to the number of docking-direction pattern pixels captured by the camera at the reference location at step S4.

The offset-information calculator 245 calculates the central point C of the extracted docking direction pattern B, the central point A contained in the captured image D, and real distance information of the distance to the docking location, such that it calculates offset information of the moving object 200 on the basis of the docking location C at step S5.

For example, if the docking direction pattern B is located at an upper right part of the captured image D as shown in FIG. 4(b), the distance-information calculator 243 can calculate distance information of the distance to the real docking location according to the ratio of the number of pixels of the really-captured docking direction pattern B to the number of the docking-direction pattern pixels captured by the camera at the reference location using predetermined pixels ranging from the central point C of the docking direction pattern to the edge of the docking direction pattern.

If the offset-information calculator 245 divides the distance between the central points C and A extracted at step S3 by the distance information calculated by the distance-information calculator 243, and expresses the divided result in the form of an arc-tangent value, it can calculate offset information of the moving object 200.

If the wheel drive 247 drives the wheel according to the offset information calculated by the offset-information calculator and the distance information calculated by the distance-information calculator at step S6, the moving object 200 is gradually arranged in a straight line with respect to the docking location C, and moves to the docking location by checking whether docking is complete at step S7. If docking is complete, the process is ended but, if not, the entire process starts anew with step S1.

Although the moving object 200 escapes from the docking location C by the above-mentioned operations, the moving object 200 is re-arranged in a straight line with respect to the docking location C and moves to the docking location in such a way that the moving object 200 can dock with the charging device 100.

Therefore, the moving-object directing system according to the present invention can quickly and correctly direct the moving object to a predetermined docking location without mechanically modifying the charging device or without using additional mechanical equipment.

As apparent from the above description, the moving-object directing system according to the present invention drives a wheel to track a central point of the docking direction pattern captured by a camera, such that it can quickly and correctly move to the docking location of the charging device.

In addition, the moving-object directing system according to the present invention uses the docking direction pattern mountable to the charging device, such that it can quickly and correctly direct the moving object to the docking location without mechanically modifying the charging device or without using additional mechanical equipment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for directing a moving object, comprising:
a charging device on which a docking direction pattern is printed, such that a central point of the docking direction pattern for directing the moving object to a docking location and a power-supply terminal are arranged in a straight line; and
the moving object,
the moving object including:
a camera for capturing an image of the docking direction pattern;
a docking direction pattern extractor for extracting the docking direction pattern and its central point from the captured image;
a distance-information calculator for calculating distance information from a current location to the docking location according to a ratio of the number of pixels ranging from the central point of the docking direction pattern to the edge of the docking direction pattern of the captured image to the number of pixels from the central point to the edge of the docking direction pattern captured at a reference location;
an offset-information calculator for calculating the angle between the current location and the docking location; and
a wheel drive for driving wheel operations of the moving object according to the offset information and the distance information.

2. The system according to claim 1, wherein the camera is installed to the moving object, such that the central point of the image captured at the reference location is identical with the central point of the docking direction pattern.

3. The system according to claim 1, wherein the offset-information calculator divides the distance from the central point of the extracted docking direction pattern to the central point of the captured image by the distance information of the distance to the docking location, and expresses the divided result in the form of an arc-tangent value.

4. The system according to claim 1, wherein:
the charging device further includes a directing signal transmitter for transmitting a docking direction signal, and
the moving object further includes a direction signal receiver for receiving the docking direction signal.

5. The system according to claim 4, wherein:
the directing signal transmitter is an infrared transmitter, and
the direction signal receiver is an infrared receiver.

6. The system according to claim 4, wherein:
the directing signal transmitter is an ultrasound transmitter, and
the direction signal receiver is an ultrasound receiver.

7. The system according to claim 1, wherein the docking direction pattern and its central point are colored in different brightness levels.

8. The system according to claim 1, wherein the moving object is a cleaning robot.

* * * * *